E. H. WAGNER.
ADJUSTABLE RADIUS ROD.
APPLICATION FILED APR. 5, 1921.
1,398,820.
Patented Nov. 29, 1921.
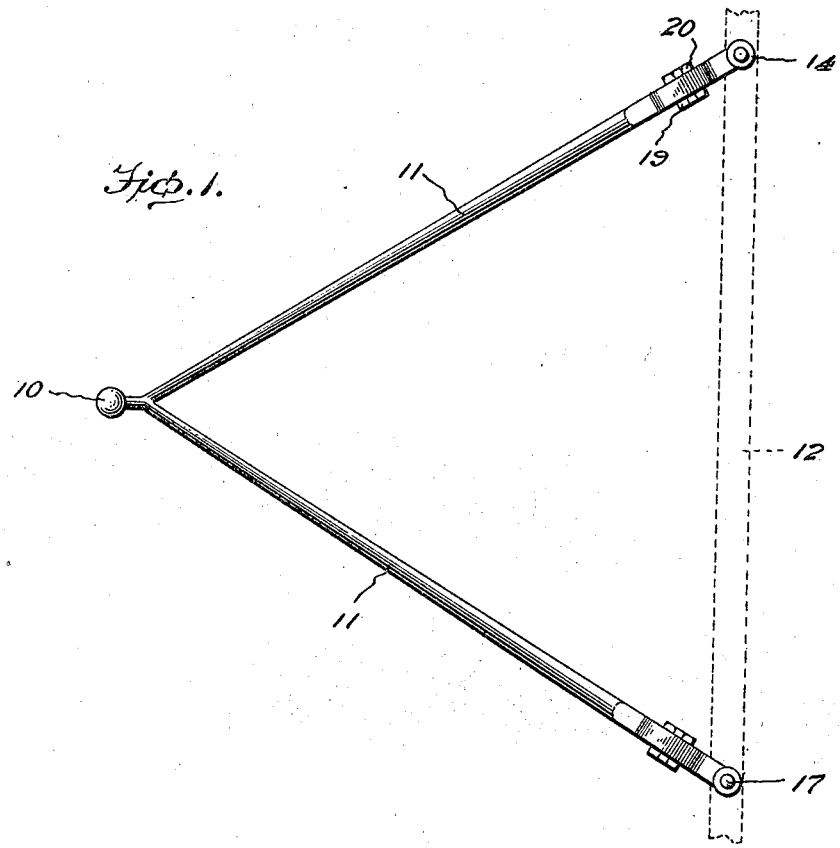
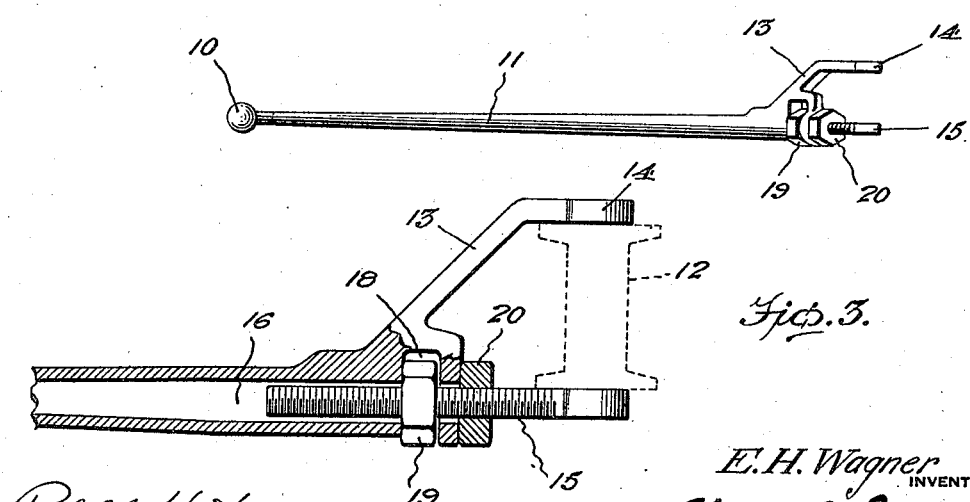
E. H. Wagner INVENTOR
BY Victor J. Evans ATTORNEY

UNITED STATES PATENT OFFICE.

EDWARD H. WAGNER, OF PROVIDENCE FORGE, VIRGINIA.

ADJUSTABLE RADIUS-ROD.

1,398,820.

Specification of Letters Patent. Patented Nov. 29, 1921.

Application filed April 5, 1921. Serial No. 458,676.

*To all whom it may concern:*

Be it known that I, EDWARD H. WAGNER, a citizen of the United States, residing at Providence Forge, in the county of New Kent and State of Virginia, have invented new and useful Improvements in Adjustable Radius-Rods, of which the following is a specification.

This invention relates to improvements in radius rods and has for an object the provision of a rod of this character which is adjustable, especially adapting it for use upon "Ford" automobiles, whereby the front axle may be maintained in proper position, at all times.

Another object of the invention is the provision of a radius rod which may be easily applied in position and which may be thereafter adjusted, as required, without removing the same, so that the axle may be kept in its proper working position.

With the above and other objects in view, the invention further includes the following novel features and details of construction, to be hereinafter more fully described, illustrated in the accompanying drawings and pointed out in the appended claim.

In the drawings:—

Figure 1 is a plan view of a radius rod embodying the present invention, the axle to which it is secured being indicated by dotted lines.

Fig. 2 is a side view of the same.

Fig. 3 is an enlarged elevation of one end of the rods, parts being broken away and shown in section and the rod shown applied to an axle.

Referring to the drawings, in detail, wherein like characters of reference denote corresponding parts, the rod as illustrated is of the usual V-shape and is provided at the apex of the V with the usual ball 10, by means of which it is secured in the manner usually employed in connection with the well known make of "Ford" automobiles, for which the invention is especially adapted.

The legs of the rod are indicated at 11 and the outer end of each leg is bifurcated for engagement over an axle 12, represented as the front axle of the automobile. In automobiles of the above mentioned type, the front axle is usually inclined upwardly and rearwardly and in order to provide for proper steering, the axle must be kept in this position, otherwise, when a sharp turn is made, the steering wheels sometimes lock, which frequently results in accident. This is especially the case in cars where the connections have become loose or strained.

The present invention aims to overcome this defect by providing an adjustable radius rod, wherein adjustment may be made from time to time, as is necessary to keep the axle in its proper inclined position. For this purpose the bifurcated end of the rod is formed by an offset arm 13 whose outer end is formed with an eye 14, the opposite arm of the bifurcation being formed by an eye bolt 15, whose threaded end is movable within a bore 16 formed in each of the arms 11. The eye 14 and the eye bolt 15 are adapted to receive the usual bolt 17 which is spaced through the bolt hole provided in the axle 12, by means of which the ordinary radius rod is secured in position.

The outer ends of the arms 11 are provided with transversely arranged grooves or notches 18, which receive an adjusting nut 19, the latter being mounted upon the threaded eye bolt 15, so that the eye bolt 15 may be adjusted with respect to the eye 14, the bolt 15 being held in its adjusted position by means of a lock nut 20.

By means of the radius rod as above described, the axle 12 may be adjusted to its proper inclination through the medium of the nut 20, so that such adjustment may be made without the removal of the radius rod from the automobile, while accidental movement of the bolt 15 is prevented by means of the nut 20.

The invention is susceptible of various changes in its form, proportions and minor details of construction and the right is herein reserved to make such changes as properly fall within the scope of the appended claim.

Having described the invention what is claimed is:—

An automobile radius rod comprising a V-shaped member and forks located at the outer ends of the arms of said member for engagement with an automobile axle, said forks each including an offset arm, an eye located at the outer end of the arm, an adjustable eye bolt, an adjusting nut swiveled in the arm of the radius rod and mounted upon the eye bolt and a clamping nut also mounted upon the eye bolt and bearing against the radius rod.

In testimony whereof I affix my signature.

EDWARD H. WAGNER.